(12) United States Patent
deValcourt et al.

(10) Patent No.: US 11,787,383 B2
(45) Date of Patent: Oct. 17, 2023

(54) UTILIZING A MULTI-TRACK CARGO HANDLING ASSEMBLY ON AN AMPHIBIOUS AIR-CUSHION VEHICLE

(71) Applicant: Textron Systems Corporation, Hunt Valley, MD (US)

(72) Inventors: Richard Kent deValcourt, Covington, LA (US); Frank Scott Allen, North Richland Hills, TX (US); William Keith DuBose, Pensacola, FL (US); Glenn Michael Hauptmann, Diamondhead, MS (US); Matthew Keith Dupre, Slidell, LA (US)

(73) Assignee: Textron Systems Corporation, Hunt Valley, MD (US)

( * ) Notice: Subject to any disclaimer, the term of this patent is extended or adjusted under 35 U.S.C. 154(b) by 0 days.

(21) Appl. No.: 17/513,096

(22) Filed: Oct. 28, 2021

(65) Prior Publication Data

US 2022/0055847 A1 Feb. 24, 2022

Related U.S. Application Data

(63) Continuation-in-part of application No. 16/983,461, filed on Aug. 3, 2020.
(Continued)

(51) Int. Cl.
*B60V 3/06* (2006.01)
*B60P 7/08* (2006.01)
(Continued)

(52) U.S. Cl.
CPC ........ *B60V 3/06* (2013.01); *B60P 1/52* (2013.01); *B60P 7/0815* (2013.01); *B63B 25/22* (2013.01);
(Continued)

(58) Field of Classification Search
CPC .. B60P 1/43; B60P 1/52; B60P 1/6427; B60P 1/6454; B60P 1/649; B60P 7/0815;
(Continued)

(56) References Cited

U.S. PATENT DOCUMENTS

| 3,251,489 A | 5/1966 | Davidson | |
| 3,483,838 A * | 12/1969 | Rath | B63H 25/42 |
| | | | 114/260 |

(Continued)

FOREIGN PATENT DOCUMENTS

| CN | 106379481 | 2/2017 | |
| CN | 106379481 A * | 2/2017 | ............. B63B 1/121 |

(Continued)

OTHER PUBLICATIONS

Aronson, Robert B., "Birth of the 100-Knot Navy", Machine Design, vol. 45, May 31, 1973.

*Primary Examiner* — James Keenan
(74) *Attorney, Agent, or Firm* — BainwoodHuang

(57) ABSTRACT

Techniques involve utilizing a multi-track cargo handling assembly to guide individual cargo items in parallel tracks to an aft end of a deck of an amphibious air cushion vehicle when unloading from the aft end. Such a multi-track cargo handling assembly includes a framework constructed and arranged to couple with the deck of the amphibious air cushion vehicle, and a set of guide rails coupled with the framework. The set of guide rails defines the parallel tracks and is constructed and arranged to constrain movement of the cargo items along the parallel tracks.

17 Claims, 13 Drawing Sheets

Related U.S. Application Data

(60) Provisional application No. 62/882,009, filed on Aug. 2, 2019.

(51) Int. Cl.
- B63B 25/28 (2006.01)
- B60P 1/52 (2006.01)
- B63B 25/22 (2006.01)
- B63B 35/00 (2020.01)
- B65G 67/60 (2006.01)

(52) U.S. Cl.
CPC ........ B63B 25/28 (2013.01); *B63B 2025/285* (2013.01); *B63B 2035/001* (2013.01); *B65G 67/603* (2013.01)

(58) Field of Classification Search
CPC .. B60V 1/18; B60V 3/06; B63B 25/22; B63B 25/28; B63B 27/143; B63B 2025/285; B63B 2035/001
See application file for complete search history.

(56) References Cited

U.S. PATENT DOCUMENTS

| | | |
|---|---|---|
| 3,817,199 A | 6/1974 | Schirtzinger |
| 3,899,092 A * | 8/1975 | Nordstrom ................ B60P 1/52 414/535 |
| 4,426,051 A * | 1/1984 | Banks ...................... B64D 1/10 410/101 |
| 5,000,634 A | 3/1991 | Ducote |
| 5,307,893 A | 5/1994 | Bender et al. |
| 5,708,230 A * | 1/1998 | Woodall, Jr. ........... B60V 1/043 89/1.13 |
| 5,951,607 A | 9/1999 | Senn et al. |
| 6,082,266 A * | 7/2000 | Auzins ..................... B63G 6/00 102/411 |
| 6,817,578 B1 | 11/2004 | Garcia et al. |
| 7,168,382 B2 * | 1/2007 | Burg ....................... B63B 35/00 180/126 |
| 7,685,953 B2 * | 3/2010 | Giles ........................ B63J 99/00 114/72 |
| 8,690,103 B2 | 4/2014 | Schulze et al. |
| 8,943,980 B2 | 2/2015 | Moberg |
| 9,079,665 B2 * | 7/2015 | Larson ................... B64D 9/003 |
| 9,242,730 B2 | 1/2016 | Larson et al. |
| 9,630,545 B1 * | 4/2017 | Corrigan ................... B60P 1/44 |
| 9,694,978 B2 | 7/2017 | Harms et al. |
| 9,738,372 B2 | 8/2017 | Barmichev et al. |
| 10,059,450 B2 | 8/2018 | Levron |
| 10,787,260 B2 | 9/2020 | Scheer et al. |
| 10,814,982 B2 | 10/2020 | Brown et al. |
| 10,960,806 B1 | 3/2021 | Sovel et al. |
| 2002/0134290 A1 | 9/2002 | Armour |
| 2004/0247422 A1 * | 12/2004 | Neumann .............. B65D 88/14 193/35 R |
| 2007/0151499 A1 * | 7/2007 | Maloney ................. B63B 35/42 114/259 |
| 2013/0145593 A1 * | 6/2013 | Holzner ................. B60P 7/0892 410/121 |

FOREIGN PATENT DOCUMENTS

| | | | |
|---|---|---|---|
| EP | 1473247 | 6/2005 | |
| FR | 2805518 | 8/2001 | |
| GB | 1079362 | 8/1967 | |
| GB | 2509358 | 7/2014 | |
| GB | 2509358 A * | 7/2014 | ............ B63B 1/121 |
| SU | 1087065 | 4/1984 | |
| WO | 2017042757 | 3/2017 | |

* cited by examiner

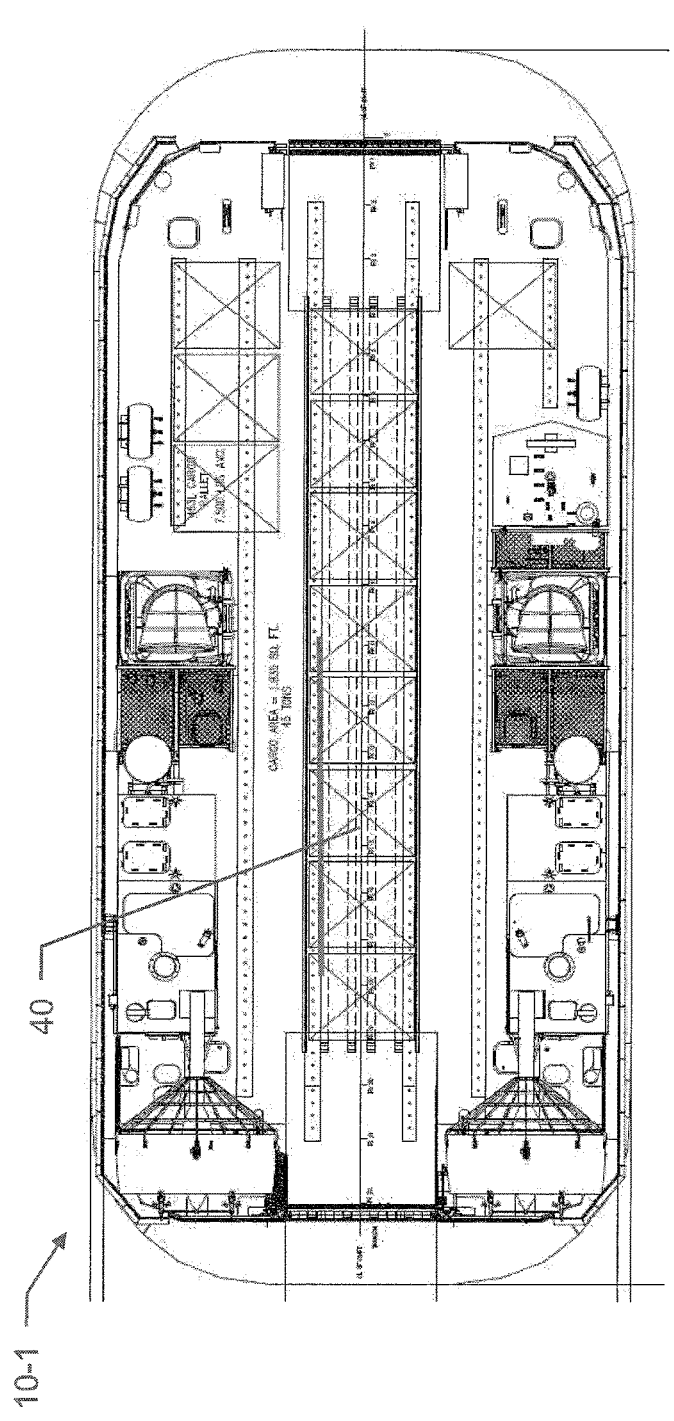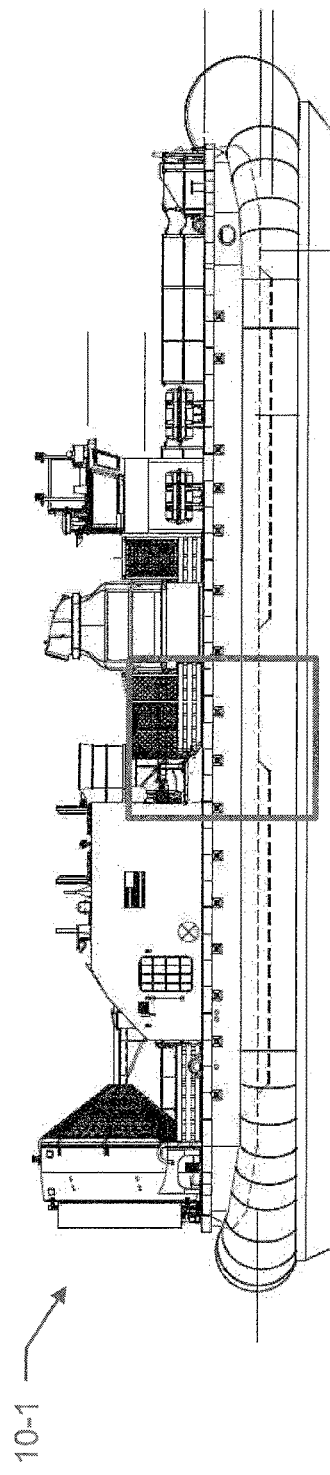
Fig. 4
Fig. 5

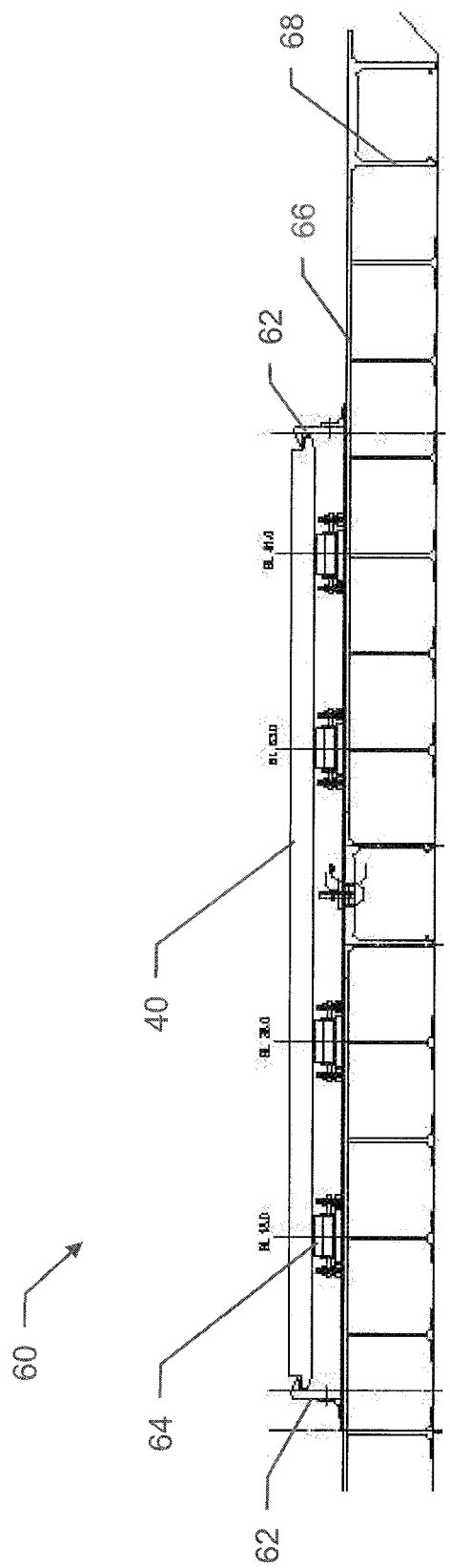

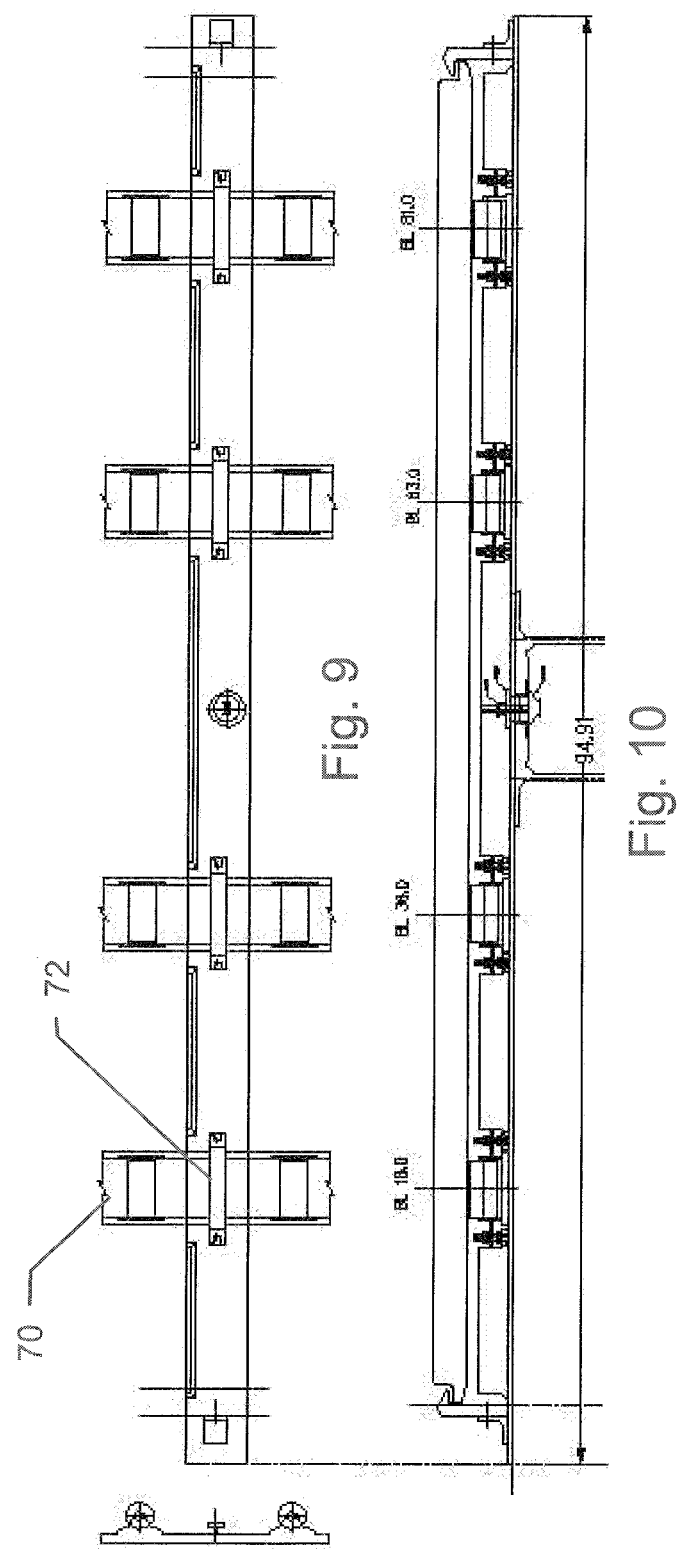

UTILIZING A MULTI-TRACK CARGO HANDLING ASSEMBLY ON AN AMPHIBIOUS AIR-CUSHION VEHICLE

CROSS REFERENCE TO RELATED APPLICATIONS

This application is a Continuation-In-Part (CIP) application based on and claiming the benefit of earlier-filed U.S. application Ser. No. 16/983,461 filed on Aug. 3, 2020, entitled "AMPHIBIOUS AIR-CUSHION VEHICLE WITH DUAL-RAIL CARGO SYSTEM", the contents and teachings of which are hereby incorporated by reference in their entirety.

Additionally, this application claims priority to and the benefit of earlier-filed U.S. Application No. 62/882,009 filed on Aug. 2, 2019, entitled "AIR CUSHION VEHICLE WITH DUAL-RAIL CARGO SYSTEM", the contents and teachings of which are hereby incorporated by reference in their entirety.

BACKGROUND

The present invention is related to the field of amphibious vehicles used for carrying and delivery of cargo.

SUMMARY

An air cushion vehicle (ACV) has a hull, a deck, a propulsion system providing vertical lift and horizontal thrust, and a dual-rail cargo system on the deck. The ACV may be configured and operative to receive and discharge palletized and/or containerized cargo at the bow and/or stern of the vehicle. The dual-rail cargo system may be an integral part of a specialized ACV, or alternatively it may be deployed as an add-on to ACVs that also have other uses. In one example, the dual-rail cargo system may be incorporated as an add-on to the so-called Ship-to-Shore Connector (SSC) sold by Textron System Corporation, which is an ACV capable of carrying 74 short tons. Such an add-on use can support missions that require rapid buildup of supplies to support beach logistics during amphibious landings. The descriptions herein are not specific to SSC, but the deployment of a dual-rail cargo system on an ACV can apply to SSC or other craft such as Landing Craft Air Cushion (LCAC) for example.

In accordance with certain embodiments, the ACV has an overall length (on cushion) of approximately 100 ft., a beam (on cushion) of approximately 44 ft., and an above-water height of approximately 22 ft. The craft features a large open cargo deck including a dual-rail cargo system, which may be similar to that used on the C130 military transport plane. Also on deck are propulsion and lift machinery along each side. In certain embodiments, hull or buoyancy box depth is approximately 5 ft., and cushion height is 5 ft.

In accordance with certain embodiments, propulsion is by two ducted propellers and lift air by centrifugal fans. Propulsion and lift power is provided by two gas turbines, each driving a lift fan impeller and a propeller assembly through a combining drive line. Craft speed and directional control is accomplished with variable pitch propellers, rudders aft of the propellers, and thrust ports on the fans.

The craft dimensions may allow for well deck compatibility for US Navy (USN) assault ships, while the gas turbine power allows for significant payloads of up to 40 short tons.

The craft control system is preferably fly by wire with an integrated flight controls (IFC) automatically coordinating the propeller pitch, rudder positions and thrusters to achieve the commanded maneuvers. The IFC may allow for manned and/or unmanned control.

A bow ramp may allow wheeled and tracked vehicles to roll on and off, while the dual rail system allows palletized cargo to be discharged across a stern ramp with the craft underway.

Advantageous function and flexibility are provided by the combination of rapid discharge of standardized cargo pallets with the versatile amphibious capability of a gas turbine powered, well deck compatible ACV.

ACV technology allows for rapid cargo transport onto remote, unimproved coast lines, inaccessible to conventional landing craft. Using a powerful over 30 ton payload capable ACV platform, the vessel can transverse deep water, shallows, and reefs, and may drive onto over 70% of the worlds beaches.

Once at a remote beach, the dual rail system enables the craft to rapidly discharge the cargo, without the need for support equipment—cranes, fork lifts or other cargo handling assets. To discharge the pallets, the craft remains on-cushion and moves forward over the beach, while the palletized cargo is released and rolls off the stern over a stern ramp extended clear over the ACV skirt system.

One embodiment is directed to an amphibious air cushion vehicle which includes an air cushion hull configured for travel on water and land, a deck supported by the hull, and a multi-track cargo handling assembly coupled with the deck. The multi-track cargo handling assembly is constructed and arranged to guide individual cargo items in parallel tracks to an aft end of the deck for unloading from the aft end.

Another embodiment is directed to a multi-track cargo handling assembly to guide individual cargo items in parallel tracks to an aft end of a deck of an amphibious air cushion vehicle when unloading from the aft end. The multi-track cargo handling assembly includes a framework constructed and arranged to couple with the deck of the amphibious air cushion vehicle, and a set of guide rails coupled with the framework. The set of guide rails defines the parallel tracks and is constructed and arranged to constrain movement of the cargo items along the parallel tracks.

Yet another embodiment is directed to a method of operating an amphibious air cushion vehicle having (i) an air cushion hull configured for travel on water and land, and (ii) a deck supported by the hull. The method includes:
  (A) loading individual cargo items onto a multi-track cargo handling assembly coupled with the deck, the multi-track cargo handling assembly being constructed and arranged to guide the cargo items in parallel tracks to an aft end of the deck for unloading from the aft end;
  (B) moving the amphibious air cushion vehicle from the water onto a landing location on the land; and
  (C) from the multi-track cargo handling assembly, dropping the cargo items off the aft end of the deck onto the landing location.

In some arrangements, dropping the cargo items includes sliding the cargo items along the parallel tracks defined by the set of guide rails while the amphibious air cushion vehicle continues moving across the landing location.

In some arrangements, the set of guide rails includes an inner guide rail, a portside guide rail, and a starboard side guide rail. Additionally, the inner guide rail and the portside guide rail are parallel to each other to constrain a first set of cargo items within a first cargo track. Furthermore, the inner guide rail and the starboard side guide rail are parallel to each other to constrain a second set of cargo items within a second cargo track that is parallel to the first cargo track.

In some arrangements, the multi-track cargo handling assembly further includes a plurality of rollers fastened to the framework and arranged within a plane above the deck. The plurality of rollers enables cargo pallets to slide fore and aft within the first and second cargo tracks.

In some arrangements, the framework includes first and second sets of roller rails. The first set of roller rails extends along the first cargo track between the inner guide rail and the portside guide rail, the first set of roller rails and a first group of rollers of the plurality of rollers forming a first set of roller type conveyors that enables cargo pallets within the first cargo track to slide fore and aft. The second set of roller rails extends along the second cargo track between the inner guide rail and the starboard side guide rail, the second set of roller rails and a second group of rollers of the plurality of rollers forming a second set of roller type conveyors that enables cargo pallets within the second cargo track to slide fore and aft.

In some arrangements, the framework further includes lateral strapping coupled with the deck. The lateral strapping is constructed and arranged to fasten the guide rails and the roller rails to the deck and hold the guide rails and the roller rails parallel to each other.

In some arrangements, each guide rail includes a vertically extending portion that extends from the deck in an upward direction to a height which is above the plurality of rollers relative to the deck to constrain movement of the cargo pallets along the cargo tracks.

In some arrangements, each guide rail further includes a top flange coupled with the vertically extending portion of that guide rail to prevent edges of the cargo pallets from moving in a vertical direction above that guide rail.

In some arrangements, the amphibious air cushion vehicle further includes a stern ramp assembly coupled with the deck. The stern ramp assembly is constructed and arranged to pivot relative to the deck between (i) a deployed position in which individual cargo items guided within the parallel tracks unload from the multi-track cargo handling assembly over the stern ramp assembly and off the amphibious air cushion vehicle, and (ii) a non-deployed position in which a free end of the stern ramp assembly extends upward to prevent individual cargo items guided within the parallel tracks from unloading from the multi-track cargo handling assembly over the stern ramp assembly and off the amphibious air cushion vehicle.

In some arrangements, the stern ramp assembly a stern ramp that defines a ramp surface capable of aligning with a deck surface of the deck, and a framework that mounts to the stern ramp over at least a portion of the ramp surface defined by the stern ramp to smoothen transition of cargo items sliding from the multi-track cargo handling assembly over the stern ramp assembly and off the amphibious air cushion vehicle.

Other embodiments are directed to systems, apparatus, processes, componentry, and so on. Some embodiments are directed to various systems, vehicles, equipment, devices, and/or mechanical mechanisms which are involved in utilizing a dual-rail cargo system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a more detailed plan view of the ACV in accordance with certain embodiments.

FIG. 5 is a more detailed elevation view of the ACV in accordance with certain embodiments.

FIG. 8 is a section view across a track of a dual-rail system in accordance with certain embodiments.

FIG. 9 is a plan view of a section of deck showing deck strapping in accordance with certain embodiments.

FIG. 10 is a section view of the section of deck showing deck strapping in accordance with certain embodiments.

DETAILED DESCRIPTION

Overview

Figure 1:
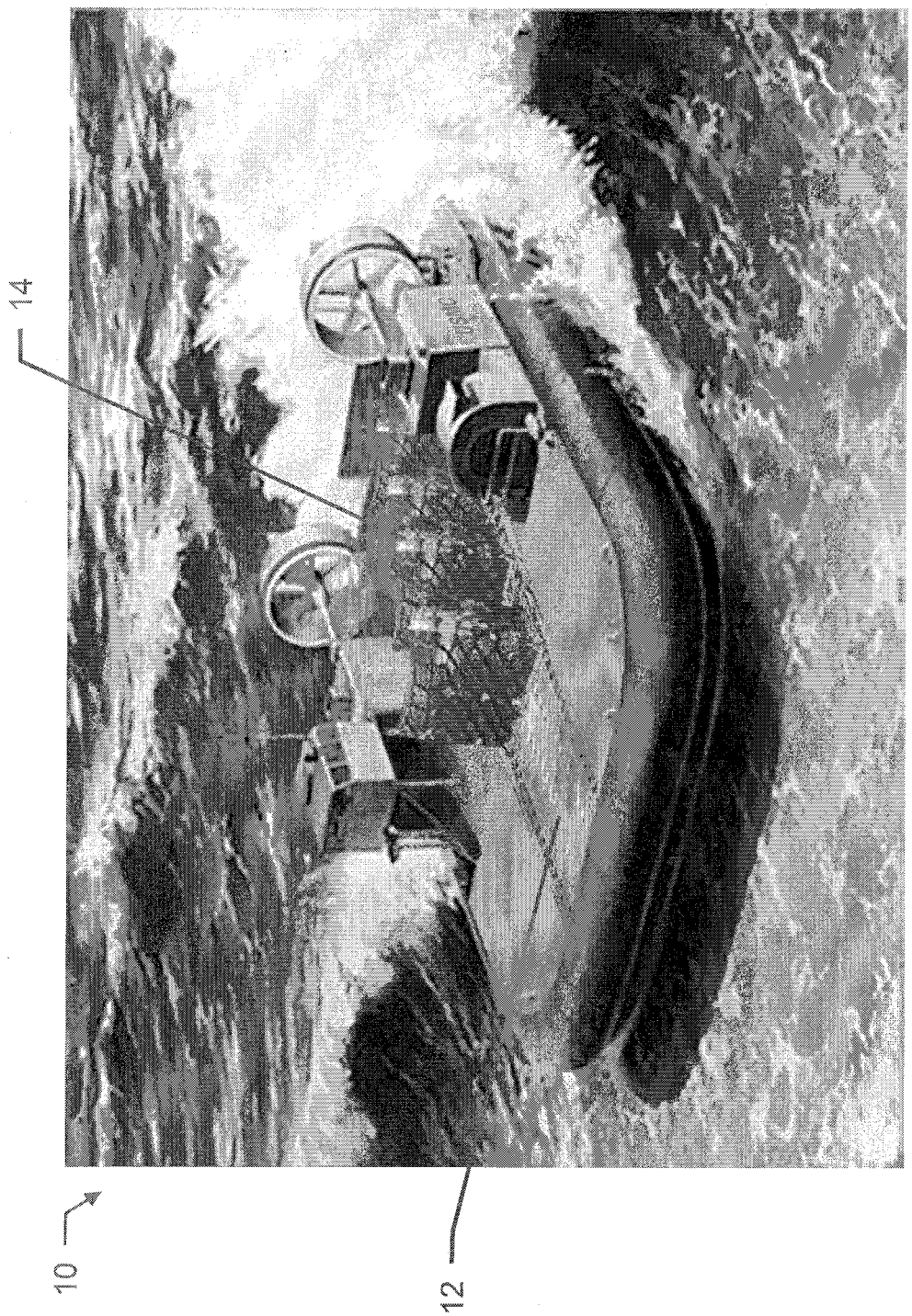
FIG. 1 is an image view of an amphibious air-cushion vehicle (ACV) in accordance with certain embodiments.

FIG. 1 shows an amphibious air-cushioned vehicle (ACV) 10. Among other features as described more below, it includes a dual-rail cargo system 12 located centrally and extending fore-aft on the deck. In use, the dual-rail cargo system 12 is used to ferry palletized cargo 14 to a beach or similar landing location accessible to the ACV 10 from the water. As described further herein, the palletized cargo 14 can be unloaded very quickly by being allowed to slide rearward along the dual-rail cargo system 12 to an aft end while the ACV 10 moves forward over the landing location, dropping the cargo 14 from the aft end. Once all cargo 14 is dropped, the ACV 10 can quickly move back out to the water. This operation may be performed a large number of times to enable the delivery of a large quantity of material into the landing location.

Figure 2:
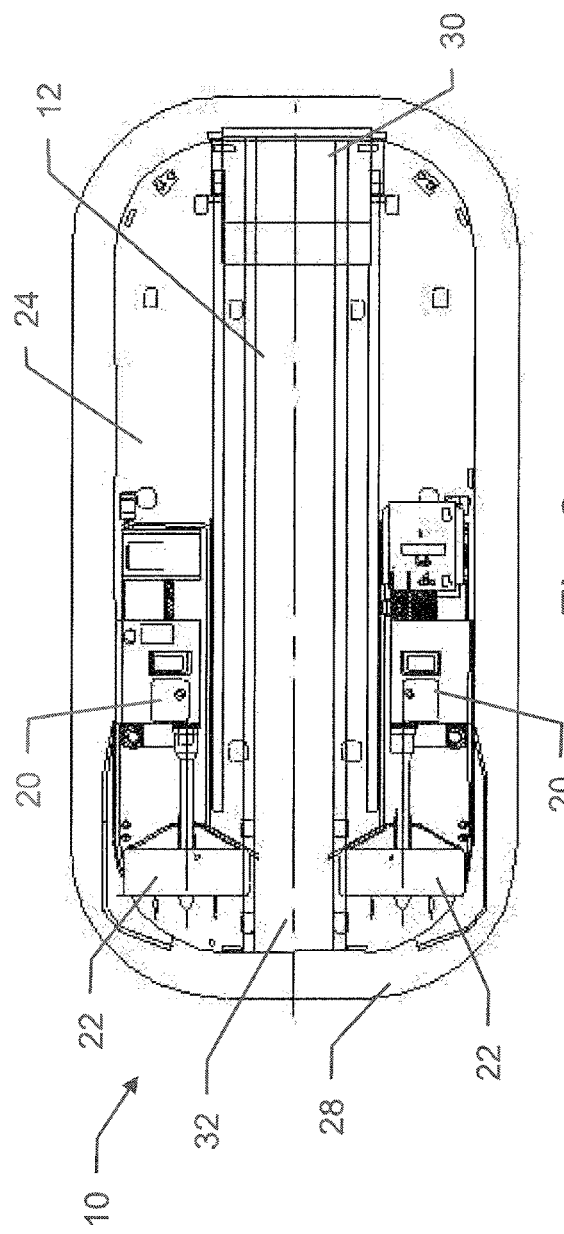
FIG. 2 is a simplified plan view of the ACV in accordance with certain embodiments.
Figure 3:
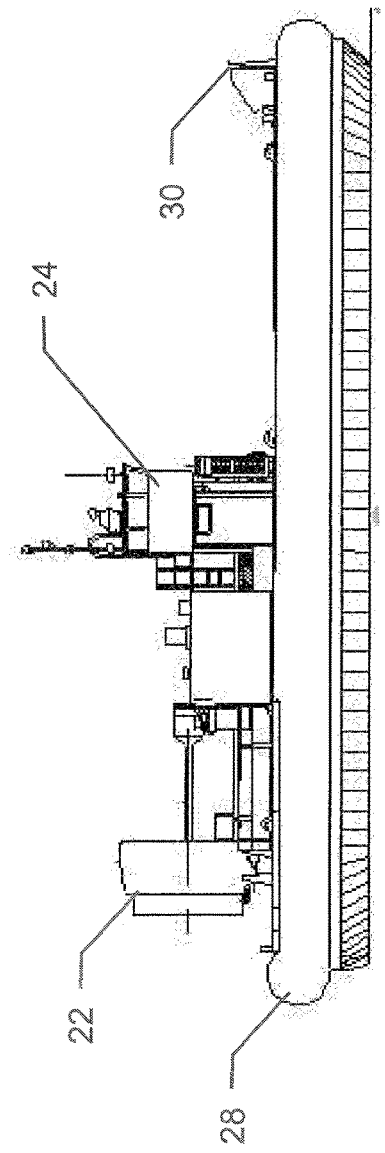
FIG. 3 is a simplified elevation view of the ACV in accordance with certain embodiments.

FIGS. 2 and 3 illustrate features of the ACV 10 in additional detail. It includes a pair of gas turbines 20 providing operating power, in particular each driving a respective propeller 22 which provides thrust during operation. Use of a single gas turbine 20 per side can provide for a simplified driveline, for example avoiding a need for a combining gearbox and overrunning clutches. A control unit 24 preferably employs so-called "fly-by-wire controls" and may enable both manned and unmanned operation of the ACV 10. The dual-rail cargo system 12 is an automated cargo delivery system based on one or more dual rail tracks and use of standardized pallets, such as HCU-6/E standardized pallets as used on the C130 cargo handling system. It may include open deck space 26 usable for either/both roll-on/roll-off (Ro-Ro) loading or crane loading, or for carrying personnel modules for example. The hull 28 preferably has a simplified structural design with continuous transverse bulkheads and no curtain plates. A bow ramp 30 can support Ro-Ro loading and unloading, and a stern ramp 32 along with a bob-tailed skirt design support palletized cargo drops as described herein.

As mentioned, the ACV 10 is preferably fully amphibious and of a size and construction enabling it to provide logistics support for desired payload size and traveling speed, which in one embodiment may be on the order of up to 30 tons and 35 knots respectively. It may be designed for either manned or unmanned operation. For certain military applications including a scenario of dropping cargo into a hostile landing area, it is preferably capable of performing a high-speed offload of all cargo 14 in an interval as short as 1-2 minutes.

The pallets used with the ACV 10 may be of a known variety having a metal sandwich-type construction and used for palletizing and transporting cargo on roller type conveyors. As in an aircraft, the dual-rail system 12 includes such roller type conveyors as well as restraint rails that guide the pallets and constrain them to move only fore and aft, for loading and unloading. The pallets are used with a locking arrangement for locking the pallet into the dual rail system for restraint during travel, as well as tie-down rings to secure the cargo to each pallet. A standard pallet has dimensions of 88 inches long by 108 inches wide by 2¼ inches thick, and has a maximum load capacity of 10,000 pounds.

FIGS. 4 and 5 show additional details of a first ACV embodiment 10-1. Specifically, this embodiment employs a single-track dual-rail system in which the pallets 40 are oriented transversely (long side extending across the rails) as shown.

Figure 6:
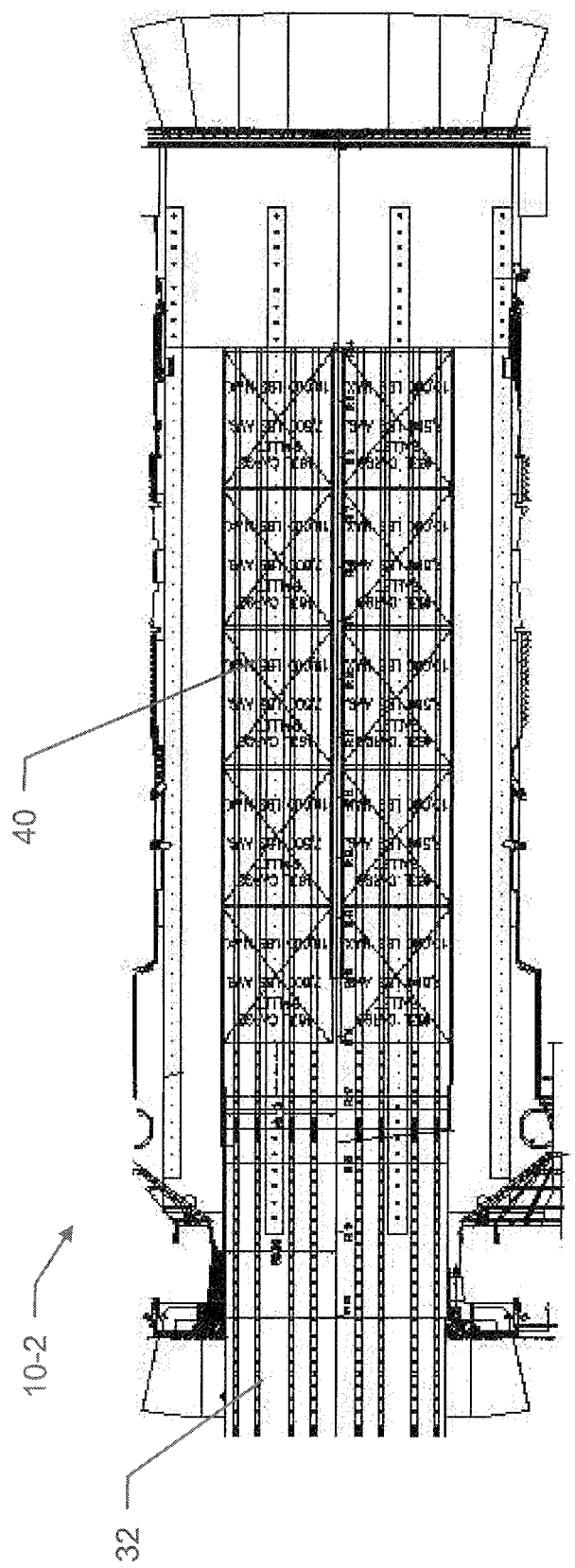
FIG. 6 is a plan view of an alternative dual-rail system employing two parallel tracks in accordance with certain embodiments.

FIG. 6 is a view of just the dual-rail system portion of an alternative embodiment 10-2 that employs two parallel tracks with the pallets 40 rotated so that their narrower dimension is across the respective track. In this embodiment, up to ten pallets 40 may be accommodated as shown. This arrangement may avoid any need for omnidirectional rollers in the tracks. In this example, each track extends off the stern ramp 32 so that two pallets 40 (one from each track) are dropped simultaneously during unloading. An alternative arrangement may be used in the stern ramp 32 has only one track for discharge, and a funneling or switching arrangement is used to move pallets 40 from each track 12 onto the single discharge track.

Figure 7:
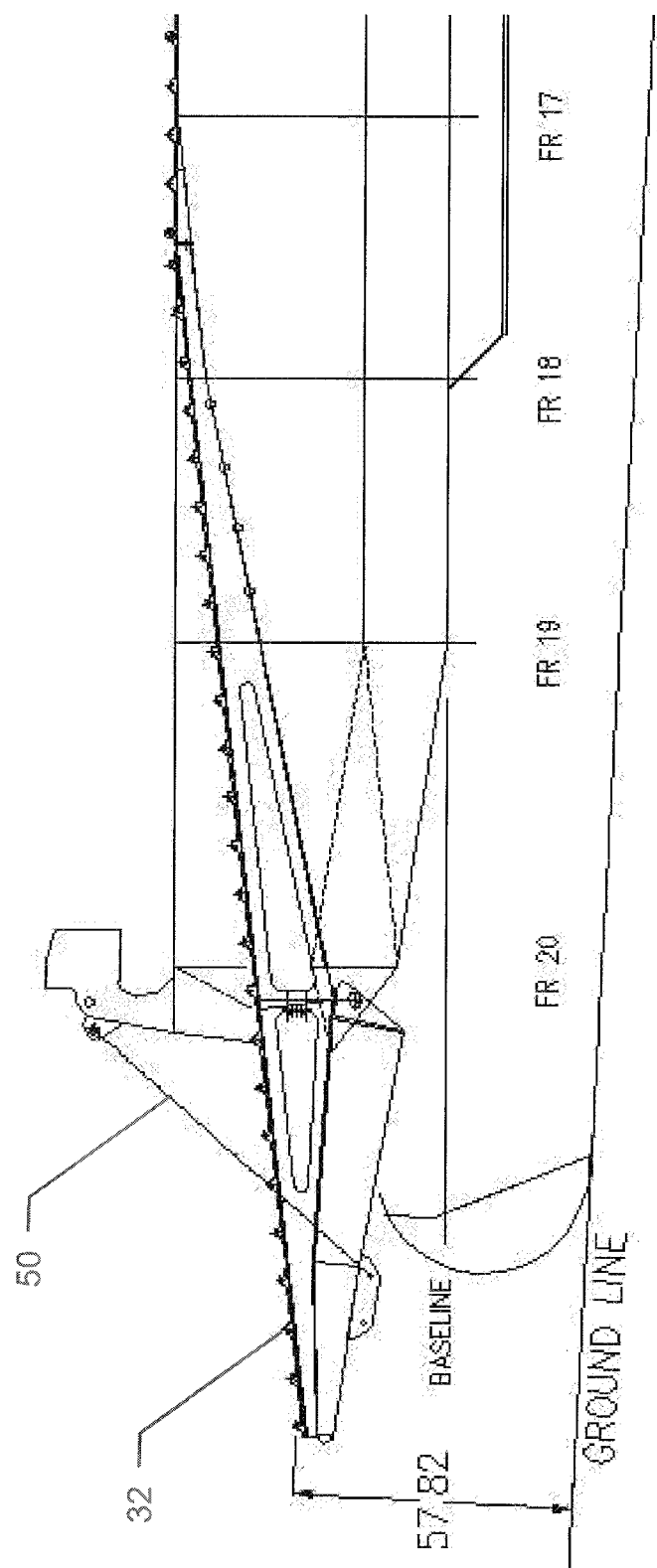
FIG. 7 is a partial elevation view of an area of a stern ramp alternative in accordance with certain embodiments.

FIG. 7 shows additional detail of the area of the stern ramp 32 in one embodiment. In this case the stern ramp 32 may be an add-on, and a beam 50 is used to support the aft end and limit lever-type loading at the attachment point. This is one example of a fixed ramp, i.e., a ramp fixedly attached to or otherwise rigidly part of the aft end of the ACV 10. In an alternative embodiment, the stern ramp may be retractable, i.e., moveable from a retracted position when not in use to an extended position when actively being used for cargo delivery.

FIG. 8 shows a section view across a track 60, illustrating the rails 62, rollers 64, and a pallet 40. Also shown are the deck surface 66 and underlying vertical support ribs 68.

FIGS. 9 and 10 show details of deck strapping that may be employed to secure elongated roller members 70 to the deck. As shown, the members 70 are tied or strapped down by sets of straps 72 that span the members 70 width-wise and are bolted into the deck.

Figure 11:
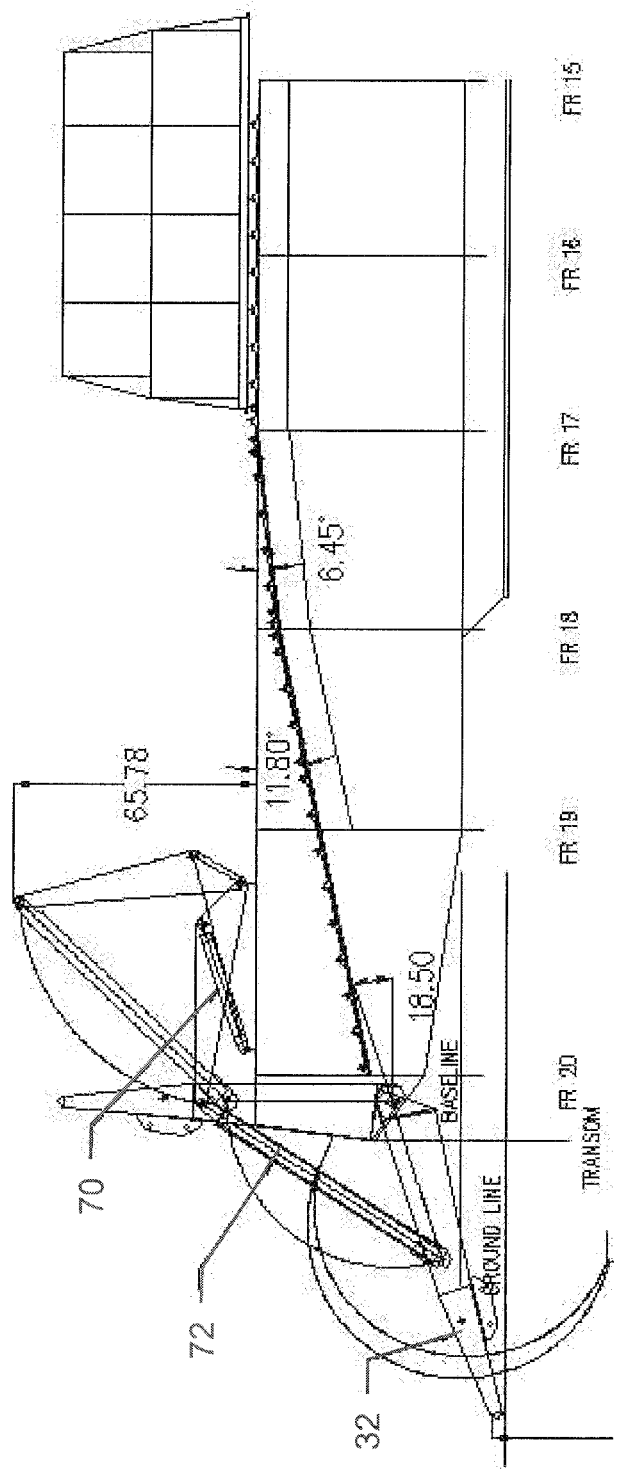
FIG. 11 is an elevation view of alternative stern ramp arrangement in accordance with certain embodiments.

FIG. 11 shows detail of an alternative aft-end arrangement. This design uses the stern ramp 32 to help depress the cushion, employing an actuator 80 and link 82 as shown.

The following is an example operating scenario for the ACV 10 for delivery of a single load of cargo:
1. Fuel Craft
2. Load cargo in well deck or expeditionary transfer dock (ESD)
3. Startup craft and come on cushion
4. Exit well deck
5. Transit from ship to surf zone
6. Transit surf zone to the beach
7. Lower stern ramp
8. Release pallet locks
9. Initiate fast offload (e.g., 45-60 seconds to deliver 40 tons)
10. Raise stern ramp and come on cushion
11. Move from beach to beyond surf zone
12. Transit back to ship
13. Re-enter well deck
14. Come off cushion, and shut down machinery Below is a bulletized description of significant features of the disclosed ACV in at least some embodiments:
1) Military Amphibious Logistics Support Craft
2) 30-40 Ton cargo capacity
3) Deployable with Well-Deck Ships e.g., LPD-17, LSD 41, LSD 49 classes, LHA and ESD.
4) Cargo types: wheeled & tracked vehicles, containerized, palletized and break-bulk cargo.
5) Drive through cargo deck
6) Open cargo deck for crane loading/unloading
7) C-130 type dual rail cargo handling system for pallets
8) ACV hullform
   a) In one embodiment, 110'×45'; 22' in height
   b) Alternative lengths 110, 100, 90, and 80 ft.; beams 36, 40, 44, and 48 ft.; Payload weights 25, 35, 45, and 55 short tons
9) Manned, remote control, or full autonomous capability
10) Propulsion & Lift
    a) Prime Movers: Marine gas turbine
    b) Transmission: Mechanical (e.g., gear train)
    c) Propulsors: Ducted air propellers
    d) Lift fans: Centrifugal fans in volutes
11) Potential alternative military missions (via application-specific deck modules as required)
    a) Mine warfare—countermeasures
    b) Intelligence, Reconnaissance, Surveillance.
    c) Mobile missile defense
    d) Mobile UAV Base.
    e) Seal team deployment and recovery
    f) Army LOTS
    g) Mobile refueling platform
    h) Mothership for manned, unmanned or autonomous vehicles
12) Potential non-military missions
    a) Oil Industry support
    b) Oil spill control & recovery in coastal wetlands
       i) Shutdown and removal of abandoned wellheads in wetlands ii) Support of drilling operations in wetland areas
iii) Support of well re-work in wetland areas
c) Remote/rugged area operations
i) Freight delivery
ii) Mail delivery
iii) Personnel transport
iv) Search & Rescue
v) Ice breaking Further Details As mentioned earlier, the ACV 10 includes a dual-rail cargo system 12 (e.g., see FIG. 1) and, in accordance with an embodiment 10-2, the dual-rail cargo system 12 of the ACV 10 employs parallel tracks (e.g., see FIG. 6). Such an embodiment 10-2 enables multiple rows of pallets 40 to be arranged on the deck surface 66 (FIG. 8) of the ACV 10 for increased carrying and/or discharge capacity.

Figure 12:
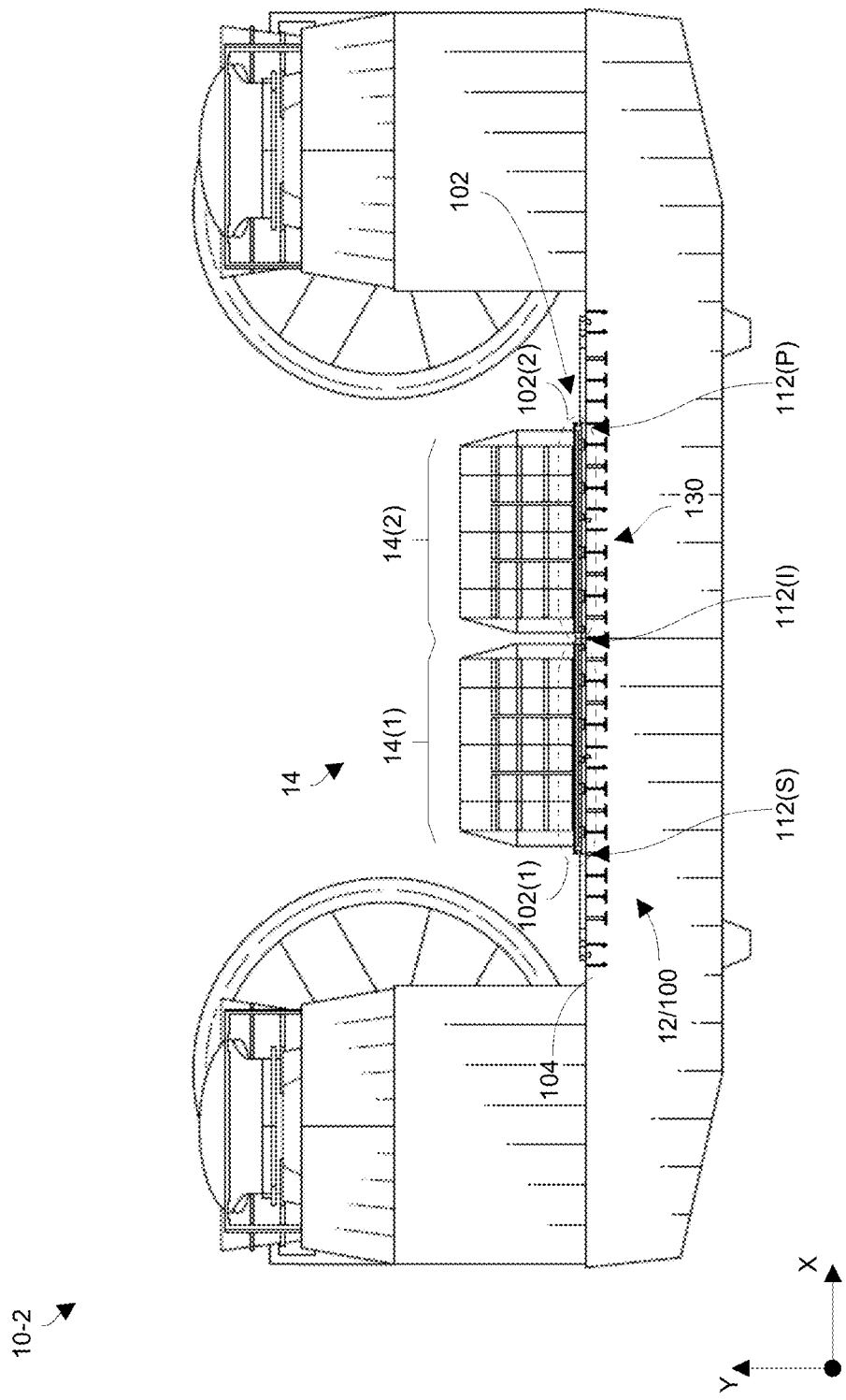
FIG. 12 is a cross-sectional view of an ACV which utilizes a multi-track cargo handling assembly in accordance with certain embodiments.
Figure 13:
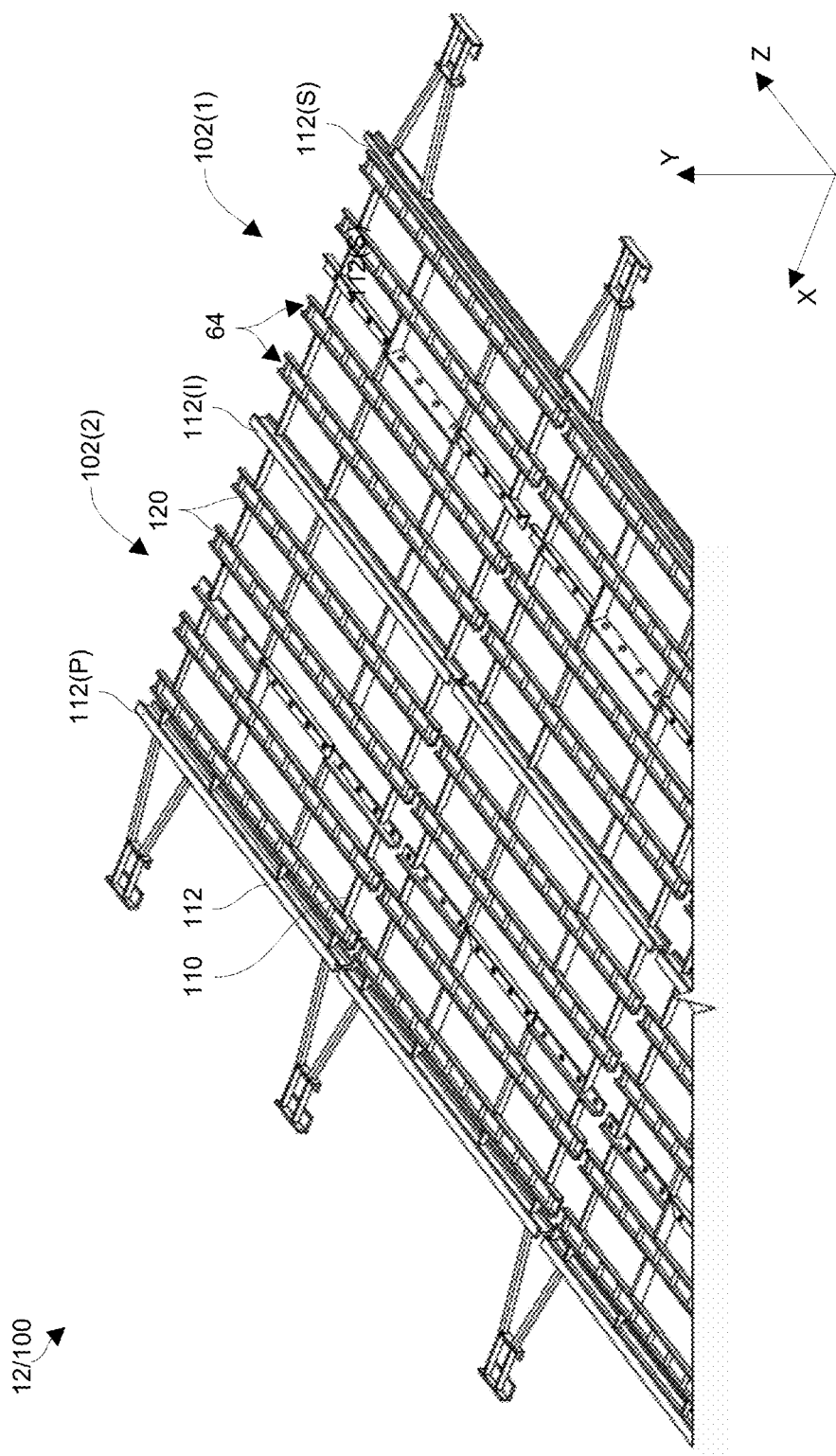
FIG. 13 is a perspective view of a portion of the multi-track cargo handling assembly in accordance with certain embodiments.

FIGS. 12 and 13 show further details in accordance with the embodiment 10-2. FIG. 12 is a cross-sectional view of the ACV 10. FIG. 13 is a perspective view of a portion of the dual-rail cargo system 12.

As shown in FIGS. 12 and 13, the dual-rail cargo system 12 takes the form of a multi-track cargo handling assembly 100 which provides multiple dual rail tracks 102(1), 102(2) (collectively, dual rail tracks 102) configured to carry and discharge multiple rows of palletized cargo 14(1), 14(2) (also see the pallets 40 in FIG. 6). Such rows of cargo 14 are seen as going into the page (i.e., the negative Z-direction) in FIG. 12. The multi-track cargo handling assembly 100 is constructed and arranged to guide individual cargo items 14 in parallel tracks 102 to an aft end of the ACV deck 104 (also see the deck surface 66 in FIG. 8) when unloading from the aft end.

As best seen in FIG. 13, the multi-track cargo handling assembly 100 includes a framework 110 constructed and arranged to couple with the ACV deck 104, and a set of guide rails 112 coupled with the framework 110. The set of guide rails 112 defines the parallel tracks 102 and is constructed and arranged to constrain movement of the cargo items 14 along the parallel tracks 102.

The set of guide rails 112 includes an inner guide rail 112(I), a portside guide rail 112(P), and a starboard side guide rail 112(S) which extend in the Z-direction. The inner guide rail 112(I) and the starboard side guide rail 112(S) are parallel to each other to constrain a first set of cargo items 14 within the cargo track 102(1). Similarly, the inner guide rail 112(I) and the portside guide rail 112(P) are parallel to each other to constrain a second set of cargo items 14 within the cargo track 102(2) that is parallel to the cargo track 102(1).

The multi-track cargo handling assembly 100 further includes rollers 64 (also see FIG. 8) fastened to the framework 110. The rollers 64, when the framework 110 couples with the deck 104, are arranged within a plane (the X-Z plane in FIG. 12) above the deck 104. Such rollers 64 enable the palletized cargo 14 to slide fore and aft (along the Z-axis) within the cargo tracks 102.

As best seen in FIG. 13, the framework 110 includes roller rails 120 (also see the elongated roller members 70 in FIG. 9) that extend along the cargo tracks 102 parallel to the guide rails 112. Such roller rails 120 hold the rollers 64 in place as well as allow the rollers 64 to rotate.

Along these lines, a first set of roller rails 120 extends along the cargo track 102(1) between the inner guide rail 112(I) and the starboard guide rail 112(S). The first set of roller rails 120 and a first group of rollers 64 form a first set of roller type conveyors that enables palletized cargo 14(1) within the first cargo track 102(1) to slide fore and aft.

Likewise, a second set of roller rails 120 extends along the cargo track 102(2) between the inner guide rail 112(I) and the portside side guide rail 112(P). The second set of roller rails 120 and a second group of rollers 64 form a second set of roller type conveyors that enables palletized cargo 14(2) within the second cargo track 102(2) to slide fore and aft.

In accordance with some embodiments, each guide rail 112 includes a vertically extending portion that extends in an upward direction (in the positive Y-direction in FIGS. 12 and 13) to a height which is above the rollers 64 to constrain movement of the cargo pallets 40 along the cargo tracks 102. Additionally, each guide rail 112 includes a top flange coupled with the vertically extending portion of that guide rail 112 to prevent edges of the cargo pallets 40 from moving in a vertical direction above that guide rail 112 (e.g., also see FIGS. 8 and 10).

It should be understood that the framework 110 further includes various hardware or strapping 130 (e.g., brackets, clamps, straps, ties, cables, other hardware, combinations thereof, etc.) constructed and arranged to couple with the deck 104 (FIG. 12) in order to fasten the guide rails 112 and the roller rails 120 to the deck 104 and hold the guide rails 112 and the roller rails parallel to each other 120. Such strapping 130 may be interconnected to form a contiguous mesh and/or reside separately as individual strapping components (e.g., also see the straps 72 that span the members 70 in FIG. 9).

Figure 14:
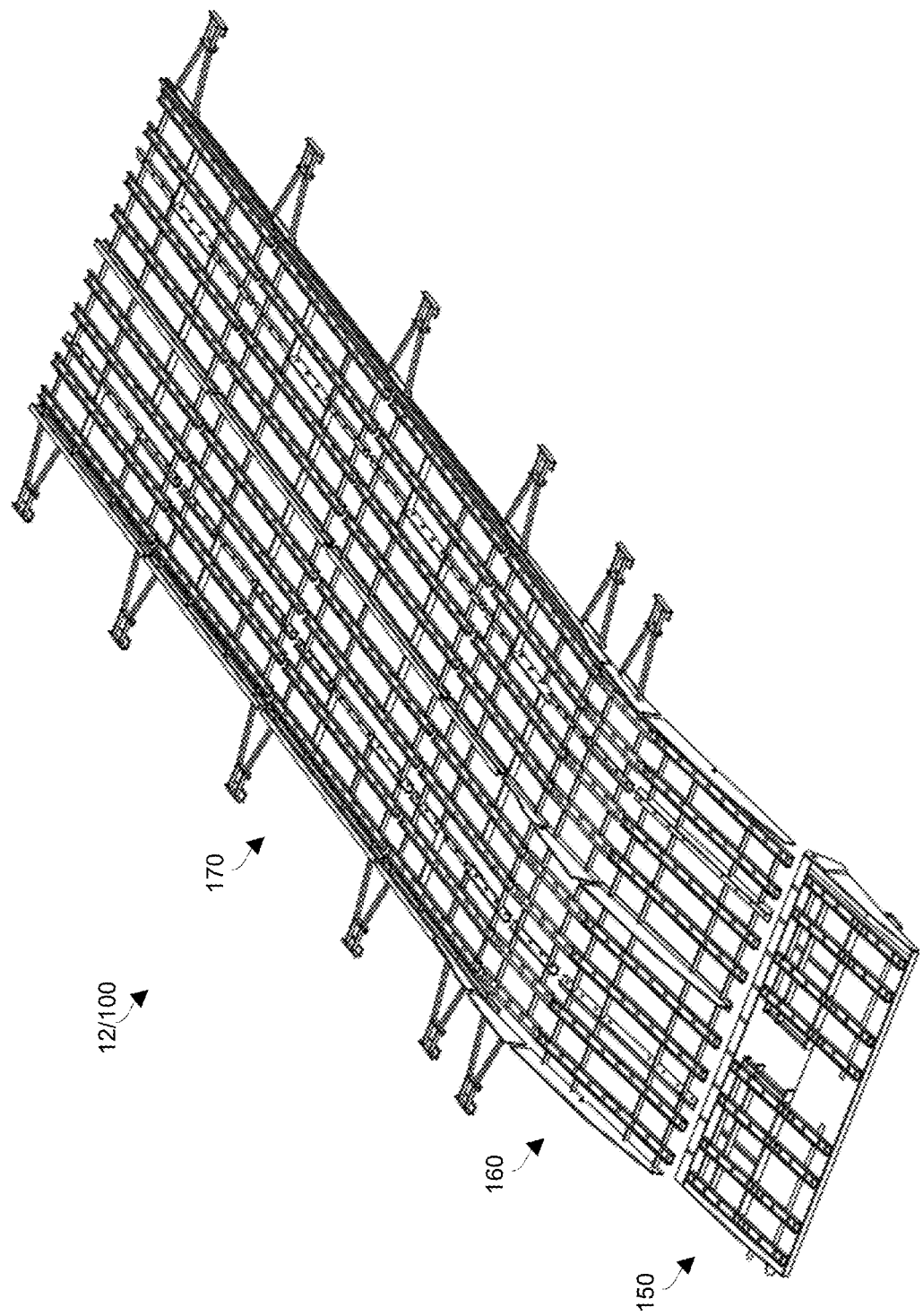
FIG. 14 is a perspective view of a multi-track cargo handling assembly which further includes a portion of a stern ramp assembly in accordance with certain embodiments.
Figure 15:
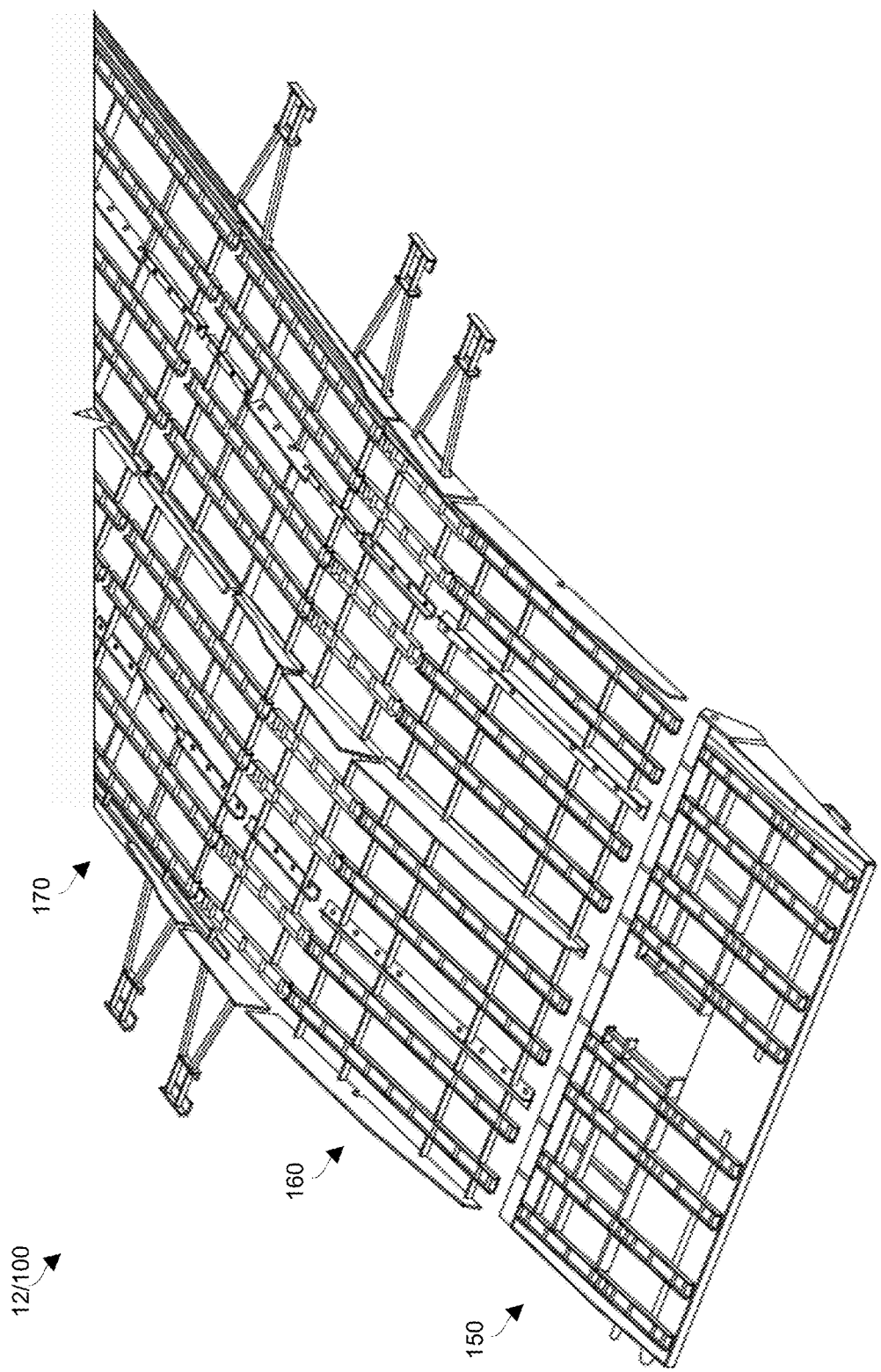
FIG. 15 is a close-up view of the portion of the stern ramp assembly in accordance with certain embodiments.

FIGS. 14 and 15 show certain stern ramp details in accordance with certain embodiments. FIG. 14 shows the multi-track cargo handling assembly 100 as further including a framework portion (or simply framework) 150 of a stern ramp assembly. FIG. 15 provides a close-up view of the framework 150 of the stern ramp assembly.

In accordance with some embodiments, the ACV 10 includes a stern ramp assembly having a stern ramp 32 (also see FIGS. 7 and 11), and a framework 150 (FIGS. 14 and 15). The stern ramp assembly is constructed and arranged to pivot relative to the deck. In particular, the stern ramp assembly may deflect between (i) a deployed position in which individual cargo items 14 guided within the parallel tracks 102 unload from the multi-track cargo handling assembly 100 over the stern ramp assembly 150 and off the ACV 10 (FIG. 7), and (ii) a non-deployed position in which a free end of the stern ramp assembly 150 extends upward (FIG. 11) to prevent individual cargo items 14 guided within the parallel tracks 102 from unloading from the multi-track cargo handling assembly 100 over the stern ramp assembly 150 and off the ACV 10.

As best seen in FIGS. 14 and 15, the framework 150 is constructed and arranged to mount to the stern ramp 32 over at least a portion of the ramp surface defined by the stern ramp 32 to smoothen transition of cargo items 14 sliding from the multi-track cargo handling assembly 100 over the stern ramp assembly and off the air cushion vehicle 10.

In some arrangements, the framework 150 is provisioned similarly to the multi-track cargo handling assembly 100 in that the framework 150 includes roller rails and rollers. Accordingly, the framework 150 may provide roller type conveyor operation similar to that of the multi-track cargo handling assembly 100.

In some arrangements, the multi-track cargo handling assembly 100 includes an angled section 160 that services as a transition between a fully horizontal section 170 and the framework 150 when the stern ramp 32 is in the deployed position. Accordingly, the angled section 160 provides smooth continuity between the fully horizontal section 170 and the framework 150 to facilitate cargo deployment. In some embodiments, both the fully horizontal section 170 and the angled section 160 of the multi-track cargo handling assembly 100 mounts to and matches the contour of the ACV deck 104 (FIG. 12).

Figure 16:
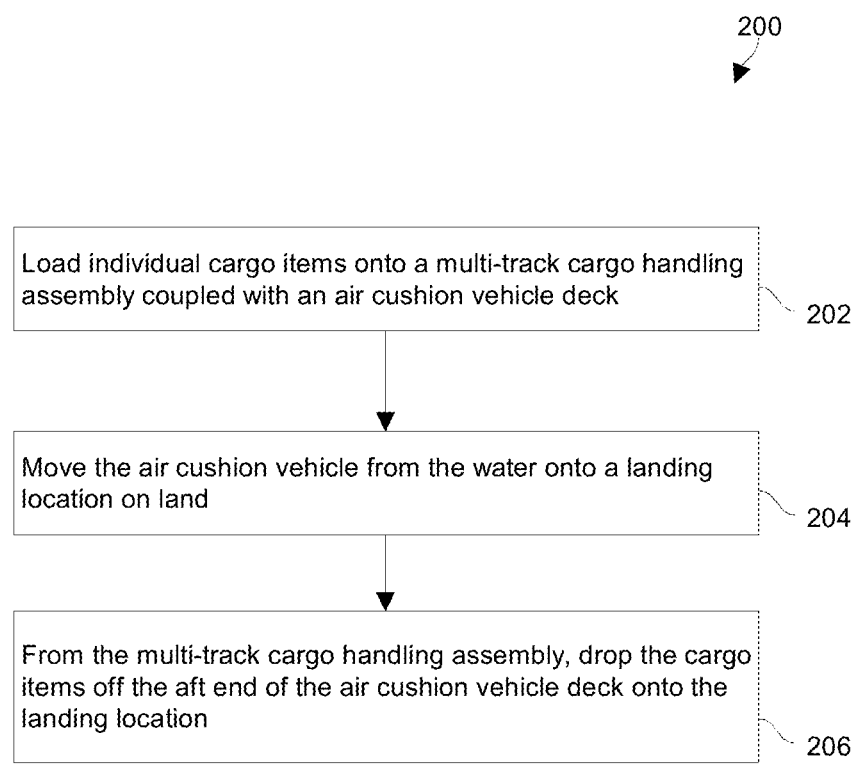
FIG. 16 is a flowchart of a procedure which utilizes a multi-track cargo handling assembly in accordance with certain embodiments.

FIG. 16 is a flowchart of a procedure 200 which utilizes a multi-track cargo handling assembly in accordance with certain embodiments. Such utilization may be performed by an operator of an air cushion vehicle having (i) an air cushion hull configured for travel on water and land, and (ii) a deck supported by the hull.

At 202, the operator loads individual cargo items onto a multi-track cargo handling assembly coupled with the deck. The multi-track cargo handling assembly is constructed and arranged to guide the cargo items in parallel tracks to an aft end of the deck for unloading from the aft end.

At 204, the operator moves the amphibious air cushion vehicle from the water onto a landing location on the land.

At 206, the operator drops, from the multi-track cargo handling assembly, the cargo items off the aft end of the deck onto the landing location. Along these lines, the operator may slide the cargo items along parallel tracks defined by a set of guide rails of the multi-track cargo handling assembly (e.g., also see FIGS. 12 through 15) while the amphibious air cushion vehicle continues moving across the landing location.

It should be understood that the procedure 200 is well suited for rapid cargo deployment missions. For example, the procedure 200 may be performed to rapidly discharge standardized cargo pallets from an amphibious air cushion vehicle along a shoreline.

As described above, certain embodiments improve cargo handling using cargo rollers mounted to the cargo deck of a landing craft. Along these lines, rapid deployment of containerized cargo pallets is easily achieved via utilization of a dual rail cargo roller system.

In accordance with certain embodiments, such a system may be combined with the versatile amphibious capability of a gas turbine powered, well deck compatible ACV to accomplish supply delivery missions (e.g., military operations, disaster relief, etc.). For example, a roller kit may be added to the cargo deck of a ship-to-shore vehicle to allow large payload deliveries on to a beach using 463L pallets without parachutes and aircraft.

That is, it should be appreciated that certain military operations may prefer using palletized cargo called 463L pallets that can be rapidly deployed from aircraft using parachutes and hot landings to deliver supplies to support troops. Adding a roller kit to the cargo deck of a ship-to-shore vehicle would allow the use of the same 463L pallets and a larger payload delivery on to a beach without the use of parachutes and aircraft. Hot landings refer to the use of an aircraft landing at an airfield that is under attack or not secure. This high risk maneuver requires the aircraft to jettison its load onto the tarmac while taxiing with its aft ramp lowered.

However, in accordance with certain embodiments disclosed herein, a kit that may be installed on a ship-to-shore vehicle that supports a roller rail system that the preloaded 463L pallets can be easily rolled off the stern ramp as the ship-to-shore vehicle travels across the landing area of a beach or flat ground. In such a situation, the landing craft may traverse the beach or landing zone while moving, lowering its rear ramp and then jettisoning the cargo pallets without stopping.

Without such a kit, a conventional ship-to-shore vehicle would simply unload palletized cargo using an all-terrain forklift. However, it could be logistically difficult and/or time consuming to make such a forklift available at the landing zone or carry the forklift with the cargo load to unload the cargo.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

What is claimed is:

1. An amphibious air cushion vehicle, comprising:
an air cushion hull configured for travel on water and land;
a deck supported by the hull; and
a multi-track cargo handling assembly coupled with the deck, the multi-track cargo handling assembly being constructed and arranged to guide individual cargo items in parallel tracks to an aft end of the deck for unloading from the aft end;
wherein the multi-track cargo handling assembly includes:
a framework coupled with the deck; and
a set of guide rails coupled with the framework, the set of guide rails defining the parallel tracks and being constructed and arranged to constrain movement of the cargo items along the parallel tracks;
wherein the set of guide rails includes:
an inner guide rail, a portside guide rail, and a starboard side guide rail;
wherein the inner guide rail and the portside guide rail are parallel to each other to constrain a first set of cargo items within a first cargo track;
wherein the inner guide rail and the starboard side guide rail are parallel to each other to constrain a second set of cargo items within a second cargo track that is parallel to the first cargo track;
wherein the amphibious air cushion vehicle further comprises:
a stern ramp that defines a ramp surface and that is coupled with the aft end of the deck; and
a stern ramp framework coupled with the stern ramp, the stern ramp framework being constructed and arranged to, while the amphibious air cushion vehicle is moving, (i) receive sets of cargo items sliding from the multi-track cargo handling assembly and (ii) unload the sets of cargo items off the amphibious air cushion vehicle at a landing location; and
wherein the multi-track cargo handling assembly further includes:
a locking mechanism constructed and arranged to (i) lock the first and second sets of cargo items in position on the amphibious air cushion vehicle, (ii) while the amphibious air cushion vehicle is moving, unlock the first set of cargo items to enable the first set of cargo items to slide along the first cargo track, onto the stern ramp framework, and off the amphibious air cushion vehicle separately from the second set of cargo items, and (iii) while the amphibious air cushion vehicle is moving, unlock the second set of cargo items to enable the second set of cargo items to slide along the second cargo track, onto the stern ramp framework, and off the amphibious air cushion vehicle separately from the first set of cargo items.

2. An amphibious air cushion vehicle as in claim 1 wherein the multi-track cargo handling assembly further includes:
a plurality of rollers fastened to the framework and arranged within a plane above the deck, the plurality of rollers enabling cargo pallets to slide fore and aft within the first and second cargo tracks.

3. An amphibious air cushion vehicle as in claim 2 wherein the framework includes:
a first set of roller rails that extend along the first cargo track between the inner guide rail and the portside guide rail, the first set of roller rails and a first group of rollers of the plurality of rollers forming a first set of conveyors that enables cargo pallets within the first cargo track to slide fore and aft; and
a second set of roller rails that extend along the second cargo track between the inner guide rail and the starboard side guide rail, the second set of roller rails and a second group of rollers of the plurality of rollers forming a second set of conveyors that enables cargo pallets within the second cargo track to slide fore and aft.

4. An amphibious air cushion vehicle as in claim 3 wherein the framework further includes:
lateral strapping coupled with the deck, the lateral strapping fastening the guide rails and the roller rails to the deck and holding the guide rails and the roller rails parallel to each other.

5. An amphibious air cushion vehicle as in claim 2 wherein each guide rail includes:
a vertically extending portion that extends from the deck in an upward direction to a height which is above the plurality of rollers relative to the deck to constrain movement of the cargo pallets along the cargo tracks.

6. An amphibious air cushion vehicle as in claim 5 wherein each guide rail further includes:
a top flange coupled with the vertically extending portion of that guide rail to prevent edges of the cargo pallets from moving in a vertical direction above that guide rail.

7. An amphibious air cushion vehicle as in claim 1, wherein the stern ramp is constructed and arranged to pivot relative to the deck between (i) a deployed position in which individual cargo items guided within the parallel tracks unload from the multi-track cargo handling assembly over the stern ramp framework and off the amphibious air cushion vehicle, and (ii) a non-deployed position in which a free end of the stern ramp extends upward to prevent individual cargo items guided within the parallel tracks from unloading from the multi-track cargo handling assembly over the stern ramp framework and off the amphibious air cushion vehicle.

8. An amphibious air cushion vehicle as in claim 7 wherein the ramp surface is capable of aligning with a deck surface of the amphibious air cushion vehicle deck; and
wherein the stern ramp framework mounts to the stern ramp over at least a portion of the ramp surface defined by the stern ramp to smoothen transition of cargo items sliding from the multi-track cargo handling assembly over the stern ramp framework and off the amphibious air cushion vehicle.

9. A multi-track cargo handling assembly to guide individual cargo items in parallel tracks to an aft end of a deck of an amphibious air cushion vehicle when unloading from the aft end, the multi-track cargo handling assembly comprising:
a framework constructed and arranged to couple with the deck of the amphibious air cushion vehicle; and
a set of guide rails coupled with the framework, the set of guide rails defining the parallel tracks and being constructed and arranged to constrain movement of the cargo items along the parallel tracks;
wherein the set of guide rails includes:
an inner guide rail, a portside guide rail, and a starboard side guide rail;
wherein the inner guide rail and the portside guide rail are parallel to each other to constrain a first set of cargo items within a first cargo track;
wherein the inner guide rail and the starboard side guide rail are parallel to each other to constrain a second set of cargo items within a second cargo track that is parallel to the first cargo track;
wherein the amphibious air cushion vehicle further comprises:
a stern ramp that defines a ramp surface and that is coupled with the aft end of the deck; and
a stern ramp framework coupled with the stern ramp, the stern ramp framework being constructed and arranged to, while the amphibious air cushion vehicle is moving, (i) receive sets of cargo items sliding from the multi-track cargo handling assembly and (ii) unload the sets of cargo items off the amphibious air cushion vehicle at a landing location; and
wherein the multi-track cargo handling assembly further includes:
a locking mechanism constructed and arranged to (i) lock the first and second sets of cargo items in position on the amphibious air cushion vehicle, (ii) while the amphibious air cushion vehicle is moving, unlock the first set of cargo items to enable the first set of cargo items to slide along the first cargo track, onto the stern ramp framework, and off the amphibious air cushion vehicle separately from the second set of cargo items, and (iii) while the amphibious air cushion vehicle is moving, unlock the second set of cargo items to enable the second set of cargo items to slide along the second cargo track, onto the stern ramp framework, and off the amphibious air cushion vehicle separately from the first set of cargo items.

10. A multi-track cargo handling assembly as in claim 9 wherein the multi-track cargo handling assembly further includes:
a plurality of rollers fastened to the framework; and
wherein the plurality of rollers, when the framework is coupled with the deck, are arranged within a plane above the deck, the plurality of rollers enabling cargo pallets to slide fore and aft within the first and second cargo tracks.

11. A multi-track cargo handling assembly as in claim 10 wherein the framework includes:
a first set of roller rails that extend along the first cargo track between the inner guide rail and the portside guide rail, the first set of roller rails and a first group of rollers of the plurality of rollers forming a first set of conveyors that enables cargo pallets within the first cargo track to slide fore and aft; and
a second set of roller rails that extend along the second cargo track between the inner guide rail and the starboard side guide rail, the second set of roller rails and a second group of rollers of the plurality of rollers forming a second set of conveyors that enables cargo pallets within the second cargo track to slide fore and aft.

12. A multi-track cargo handling assembly as in claim 11 wherein the framework further includes:

lateral strapping constructed and arranged to couple with the deck to fasten the guide rails and the roller rails to the deck and hold the guide rails and the roller rails parallel to each other.

13. A multi-track cargo handling assembly as in claim 10 wherein each guide rail includes:

when the framework is oriented horizontally, a vertically extending portion that extends in an upward direction to a height which is above the plurality of rollers to constrain movement of the cargo pallets along the cargo tracks.

14. A multi-track cargo handling assembly as in claim 13 wherein each guide rail further includes:

a top flange coupled with the vertically extending portion of that guide rail to prevent edges of the cargo pallets from moving in a vertical direction above that guide rail.

15. A multi-track cargo handling assembly as in claim 9, wherein the stern ramp is constructed and arranged to pivot relative to the deck between (i) a deployed position in which individual cargo items guided within the parallel tracks unload from the multi-track cargo handling assembly over the stern ramp framework and off the amphibious air cushion vehicle, and (ii) a non-deployed position in which a free end of the stern ramp extends upward to prevent individual cargo items guided within the parallel tracks from unloading from the multi-track cargo handling assembly over the stern ramp framework and off the amphibious air cushion vehicle.

16. A method of operating an amphibious air cushion vehicle having (i) an air cushion hull configured for travel on water and land, and (ii) a deck supported by the hull, the method comprising:

loading individual cargo items onto a multi-track cargo handling assembly coupled with the deck, the multi-track cargo handling assembly being constructed and arranged to guide the cargo items in parallel tracks to an aft end of the deck for unloading from the aft end;

moving the amphibious air cushion vehicle from the water onto a landing location on the land; and from the multi-track cargo handling assembly, dropping the cargo items off the aft end of the deck onto the landing location;

wherein the multi-track cargo handling assembly includes:

a framework coupled with the deck, and a set of guide rails coupled with the framework, the set of guide rails defining the parallel tracks and being constructed and arranged to constrain movement of the cargo items along the parallel tracks;

wherein the set of guide rails includes:

an inner guide rail, a portside guide rail, and a starboard side guide rail;

wherein the inner guide rail and the portside guide rail are parallel to each other to constrain a first set of cargo items within a first cargo track;

wherein the inner guide rail and the starboard side guide rail are parallel to each other to constrain a second set of cargo items within a second cargo track that is parallel to the first cargo track;

wherein the amphibious air cushion vehicle further comprises:

a stern ramp that defines a ramp surface and that is coupled with the aft end of the deck; and a stern ramp framework coupled with the stern ramp, the stern ramp framework being constructed and arranged to, while the amphibious air cushion vehicle is moving, (i) receive sets of cargo items sliding from the multi-track cargo handling assembly and (ii) unload the sets of cargo items off the amphibious air cushion vehicle at a landing location; and wherein the multi-track cargo handling assembly further includes:

a locking mechanism constructed and arranged to (i) lock the first and second sets of cargo items in position on the amphibious air cushion vehicle, (ii) while the amphibious air cushion vehicle is moving, unlock the first set of cargo items to enable the first set of cargo items to slide along the first cargo track, onto the stern ramp framework, and off the amphibious air cushion vehicle separately from the second set of cargo items, and (iii) while the amphibious air cushion vehicle is moving, unlock the second set of cargo items to enable the second set of cargo items to slide along the second cargo track, onto the stern ramp framework, and off the amphibious air cushion vehicle separately from the first set of cargo items.

17. A method as in claim 16 wherein dropping the cargo items includes:

sliding the cargo items along the parallel tracks defined by the set of guide rails while the amphibious air cushion vehicle continues moving across the landing location.

\* \* \* \* \*